Patented July 18, 1950

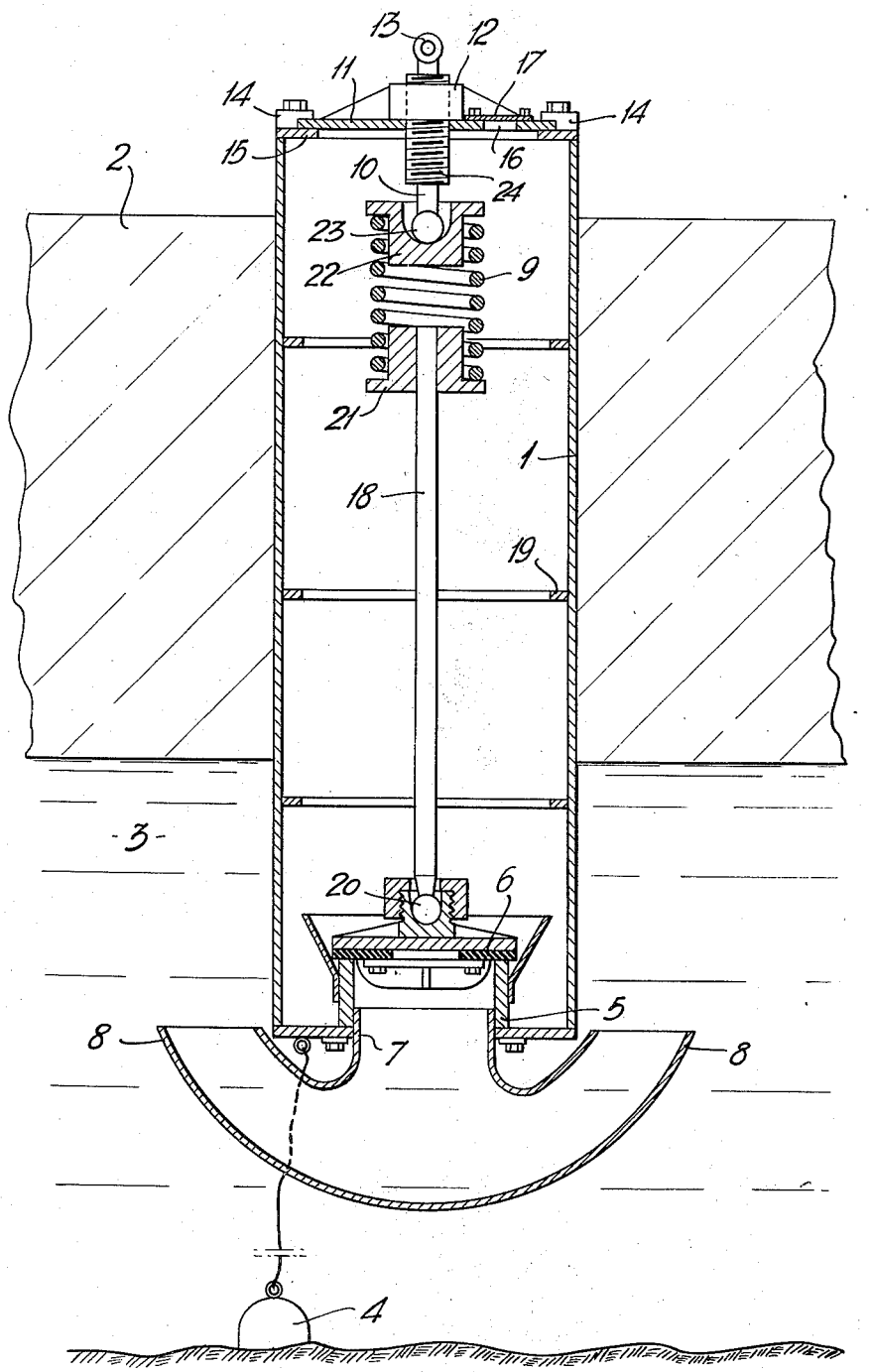

2,515,770

UNITED STATES PATENT OFFICE 2,515,770

FIRE HYDRANT

John Henric Paulus Grönberg, Filipstad, Sweden

Application October 26, 1948, Serial No. 56,570
In Sweden May 17, 1947

6 Claims. (Cl. 137—13)

The present invention relates to a fire-hydrant for drawing water from an ice-coated body of water, such as a lake or a water course of any kind. The fire-hydrant according to the invention comprises a receptacle provided with means for anchoring it in the body of water and is so dimensioned that in its anchored state it may reach by its bottom end below the maximum thickness of ice-coating that may be taken into account in the respective water body, while projecting by its top end above the water or ice-level. At its bottom end the receptacle is provided with a valve-controlled water intake and the top end of the receptacle is provided with a removable cover which supports means for controlling said bottom valve. Leading to the intake opening controlled by the bottom valve are preferably curved ducts with upwardly directed inlet ends for passing the surrounding water to the intake valve.

In the accompanying drawing an embodiment of the invention is illustrated in a vertical section.

The numeral 1 indicates a receptacle which in the example shown comprises a vertical cylinder illustrated as surrounded by a maximum thickness of ice-coating 2. The height of the receptacle is so dimensioned that in the position shown the bottom end thereof is at a suitable distance below the lower surface of the ice-coating, so that the lower portion of the receptacle is surrounded by free water, as indicated by the numeral 3. The top end of the receptacle projects above the upper surface of the ice-coating or the level of the water, as the case may be. In such position the receptacle is maintained by anchoring it in any appropriate way, as for instance, by means of a sunken weight 4. Formed in the bottom of the receptacle is a water intake opening. Placed on the bottom around the periphery of said opening is a short vertical pipe 5 the top end of which forms a seat for a valve plate 6. Extending through said intake opening so as to engage the lower end of said pipe 5 is a water intake member 7 formed with a pair of outwardly and upwardly curved inlet branches 8 the inlet openings of which are directed upwardly in order to prevent water plants growing on the bottom of the body of water, sludge and the like from entering the receptacle when the bottom valve is open.

The top end of the receptacle is provided with a removable cover 11 held in place against an inwardly projecting flange 15 at the top of the receptacle by means of a set of jaws 14. Formed in the cover 11 is a small aperture 16 covered by a lid 17 for a purpose to be hereinafter described.

The bottom valve 6 is controlled by the following mechanism.

Connected to the bottom valve 6 by means of a universal joint 20 is the lower end of a rod 18 extending centrally upward through the main portion of the receptacle and carrying at its top a collar 21. Connected, in a way not shown, to a flange of said collar is a compression spring 9 connected at its upper end to a flange of a body 22 supported by said spring 9. Formed in the upper surface of said body 22 is a rounded or cup-shaped recess engaged by the ball-shaped lower end 23 of a bolt 10 having a threaded portion 24 extending freely through a boring in the cover 11 and engaging a nut 12 mounted on the upper surface of the cover 11. Said screw bolt 10 projects above nut 12 where it carries a suitable handle 13.

The fire-hydrant shown must be placed in the body of water under consideration in summer time or at any rate before the water surface is coated with ice. When it is required to use the apparatus for fire extinguishing or other purposes the bolt 10, 24 must first be unscrewed so as to reduce the action of the spring 9 on the valve 6 via rod 18 in a sufficient degree to allow the water pressure from slightly raising valve 6 from its seat, thereby allowing water to leak into the receptacle. After a while of a sufficient duration to allow the pressures inside and outside the receptacle to equalize to a certain extent, so that a continued raising of the valve from its seat may be effected without any trouble, the jaws 14 are released and the cover 11 is removed together with nut 12 and bolt 10. Then the remaining valve controlling elements, viz. 22, 9 and 18, are lifted out of the receptacle together with the valve due to its connection with rod 18, so that the intake opening is completely uncovered and the interior of the receptacle is completely free except for possible reinforcing elements, as indicated at 19. By the uncovering of the intake opening the receptacle is immediately filled with water approximately up to the upper level of the ice-covering, and by the removal of the valve controlling element and the cover, so that the interior of the receptacle becomes free, as already stated, it is possible to insert one or more flexible pipes or tubings into the receptacle and the water therein. Through these pipes or tubings water may be pumped in the usual way.

When no more water is required, the pipes or tubings are lifted out from the interior of the receptacle, the bottom valve 6 and its controlling members 18, 9 and 22 are restored in their places and, finally, the cover is mounted on the flange 15 and locked in its place by means of the jaws 14. In restoring the cover to its place care should be taken that the ball-shaped end 23 of bolt 10 enters the recess of body 22. By turning the bolt 10 by means of the handle 13 the spring 9 may be compressed till it closes the valve 6 with a sufficient power to overcome the external water pressure acting on the lower surface of the valve. After the valve is thus reliably closed the water possibly remaining in the receptacle may be pumped out through a pipe or tubing inserted through aperture 16 after removing the lid 17. The emptying of the receptacle in this way being completed, the lid is restored so as to cover the aperture 16 and it is now seen that the receptacle is entirely closed both at its bottom and at its top. In this emptied and closed state the receptacle may remain in its place until it is again required to use it for drawing water for fire extinguishing or other purposes.

What I claim is:

1. An apparatus of the class specified comprising in combination, a floatable receptacle for mounting in a body of water, said receptacle being so constructed and arranged as to float in a substantially vertical position with the upper end thereof projecting above the water and being of such a length that its bottom end will be positioned below the maximum thickness of an ice-covering, that may appear on the body of water, means for maintaining the receptacle in a relatively fixed position in said body of water, a bottom valve for controlling a connection between the water surrounding the receptacle below the ice-covering and the interior of the receptacle, means for maintaining the said valve in closed position, said means including a spring and means for controlling the action of said spring, a removable cover for the top end of said receptacle, said cover being operatively connected to said means for controlling the action of the said spring, and means for passing water to the bottom valve of the receptacle, said last-mentioned means being arranged so as to prevent undesired objects from entering the receptacle with the water, when the bottom valve is open, the cover of the receptacle having an aperture with a removable lid associated therewith for allowing withdrawal of the water from the receptacle after the apparatus is used.

2. An apparatus of the class specified comprising in combination, a floatable receptacle of elongated shape so constructed and arranged as to float in an upright position in a body of water with the upper end thereof projecting above the water, the vertical dimension of said receptacle being greater than the maximum thickness of ice that may cover the body of water in winter time, means for anchoring said receptacle at a desired point of said body of water in a position, in which the bottom of the receptacle is positioned below the lower surface of such ice-covering of maximum thickness, while the top of the receptacle is positioned above the upper surface of such ice-covering, a water intake valve at the bottom of the receptacle for admitting water thereto from below the ice-covering, a removable cover for closing the top end of the receptacle, means extending upward through the receptacle for controlling said valve, said means including a spring for exerting a pressure on the valve to overcome the external water pressure thereon, means carried by said cover for adjusting the action of said spring, said cover being formed with an aperture and a lid to cover same for allowing an emptying of the receptacle with the bottom valve in closed state and the cover in position, and ducts for passing water from below the ice-covering to the bottom valve of the receptacle.

3. An apparatus as claimed in claim 2, characterized by the further feature that said means carried by the cover of the receptacle for adjusting the action of the spring on the bottom valve comprises a nut rigidly connected to the cover of the receptacle in register with a boring therein, and a screw-threaded bolt engaging said nut.

4. An apparatus as claimed in claim 2, characterized by the further feature that the means for controlling the bottom valve comprises a rod pivotally connected to the valve and a spring inserted between said rod, and a member operable by the adjusting mechanism carried by the cover of the receptacle.

5. An apparatus as claimed in claim 2, characterized by the further feature that the ducts for passing water from below the ice-covering to the bottom valve of the receptacle includes upwardly directed intake branches for preventing objects on the bottom of the body of water from being withdrawn into the receptacle when water is pumped therethrough.

6. An apparatus as claimed in claim 2, characterized by the further feature that the means for controlling the bottom valve including the adjusting means carried by the cover are removably mounted so that they may be removed entirely from the receptacle together with the bottom valve for rendering the interior of the receptacle free from elements which might obstruct the introduction of pumping conduits into the receptacle from the opened top end thereof.

JOHN HENRIC PAULUS GRÖNBERG.

No references cited.